(12) United States Patent
Miura et al.

(10) Patent No.: US 10,491,771 B2
(45) Date of Patent: Nov. 26, 2019

(54) IMAGE READING APPARATUS

(71) Applicant: Brother Kogyo Kabushiki Kaisha, Nagoya (JP)

(72) Inventors: Katsuro Miura, Toyota (JP); Tianjin Xie, Nagoya (JP); Satoshi Miyase, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 16/226,997

(22) Filed: Dec. 20, 2018

(65) Prior Publication Data
US 2019/0199876 A1    Jun. 27, 2019

(30) Foreign Application Priority Data
Dec. 25, 2017    (JP) .................................. 2017-248355

(51) Int. Cl.
*H04N 1/00*    (2006.01)

(52) U.S. Cl.
CPC ..... *H04N 1/00798* (2013.01); *H04N 1/00557* (2013.01); *H04N 1/00604* (2013.01); *H04N 1/00615* (2013.01)

(58) Field of Classification Search
CPC .......... H04N 1/00798; H04N 1/00557; H04N 1/00604; H04N 1/00615
USPC ....................................................... 358/498
See application file for complete search history.

(56) References Cited

U.S. PATENT DOCUMENTS

| | | | | |
|---|---|---|---|---|
| 5,130,807 A * | 7/1992 | Tanabe | ................ | H04N 1/0057 355/75 |
| 5,390,033 A * | 2/1995 | Bannai | .................. | G03G 15/60 358/400 |
| 5,539,538 A * | 7/1996 | Terao | ................... | H04N 1/0057 358/472 |
| 2002/0067940 A1 * | 6/2002 | Sasai | ......................... | B41J 2/01 400/61 |
| 2004/0218230 A1 | 11/2004 | Furihata | | |
| 2015/0062672 A1 * | 3/2015 | Kuriki | ..................... | H04N 1/12 358/498 |

FOREIGN PATENT DOCUMENTS

| | | |
|---|---|---|
| JP | 2000-296945 A | 10/2000 |
| JP | 2004-297760 A | 10/2004 |
| JP | 2005-136474 A | 5/2005 |
| JP | 2009-232035 A | 10/2009 |
| JP | 2009-303085 A | 12/2009 |
| JP | 3204815 U | 6/2016 |

* cited by examiner

*Primary Examiner* — Allen H Nguyen
(74) *Attorney, Agent, or Firm* — Burr & Brown, PLLC

(57) ABSTRACT

An image reading apparatus, having a body, a feeder tray, a conveyer, a first reader, and a shifting device, is provided. The body includes a first inlet, a second inlet, and a conveyance guide. The feeder tray being at a closed position covers the first inlet and the feeder tray being at an open position exposes the first inlet. The conveyer conveys a readable medium guided by the conveyer guide. The first reader reads an image on a first side of the readable medium conveyed by the conveyer. The shifting device shifts the first reader to a first position in a case where the feeder tray moves from the closed position to the open position and to a second position in a case where the feeder tray moves from the open position to the closed position.

13 Claims, 9 Drawing Sheets

IMAGE READING APPARATUS

CROSS REFERENCE TO RELATED APPLICATION

This application claims priority from Japanese Patent Application No. 2017-248355, filed on Dec. 25, 2017, the entire subject matter of which is incorporated herein by reference.

BACKGROUND

Technical Field

An aspect of the present disclosure is related to an image reading apparatus.

Related Art

An image reading apparatus having an adjustable scanner may be suggested. The image reading apparatus may have a body with a first inlet, a second inlet, and a conveyance guide. Inside the body, arranged may be a conveyer and a first reader to read an image on a sheet. The first inlet and the second inlet may be located at different positions, and the conveyance guide may guide a medium inserted through the first inlet or the second inlet to the first reader. The conveyer may guide the medium guided by the conveyance guide, and the first reader may read a first side of the medium being conveyed by the conveyer.

SUMMARY

The first inlet and the second inlet may be adapted to accept media in different thicknesses, and positions of the first reader to read the media in different thicknesses may be adjustable. In order to adjust the positions of the first reader, a user may need to manually shift the positions of the first reader. However, such a shifting operation may lower usability of the image reading apparatus.

The present disclosure is advantageous in that an image reading apparatus, which may improve usability to a user, is provided.

According to an aspect of the present disclosure, an image reading apparatus, having a body, a feeder tray, a conveyer, a first reader, and a shifting device, is provided. The body includes a first inlet, a second inlet arranged at a position different from the first inlet, and a conveyance guide configured to guide a readable medium inserted in the body through one of the first inlet and the second inlet. The feeder tray is movably supported by the body to move between an open position and a closed position. The feeder tray is configured to cover the first inlet at the closed position and is configured to expose the first inlet and support the readable medium to be inserted through the first inlet thereon at the open position. The conveyer is arranged in the body and is configured to convey the readable medium guided by the conveyer guide. The first reader is arranged in the body and is configured to read an image on a first side of the readable medium conveyed by the conveyer. The shifting device is arranged in the body. The shifting device is configured to shift the first reader to a first position in a case where the feeder tray moves from the closed position to the open position. The shifting device is configured to shift the first reader to a second position in a case where the feeder tray moves from the open position to the closed position.

BRIEF DESCRIPTION OF THE ACCOMPANYING DRAWINGS

Figure 6:
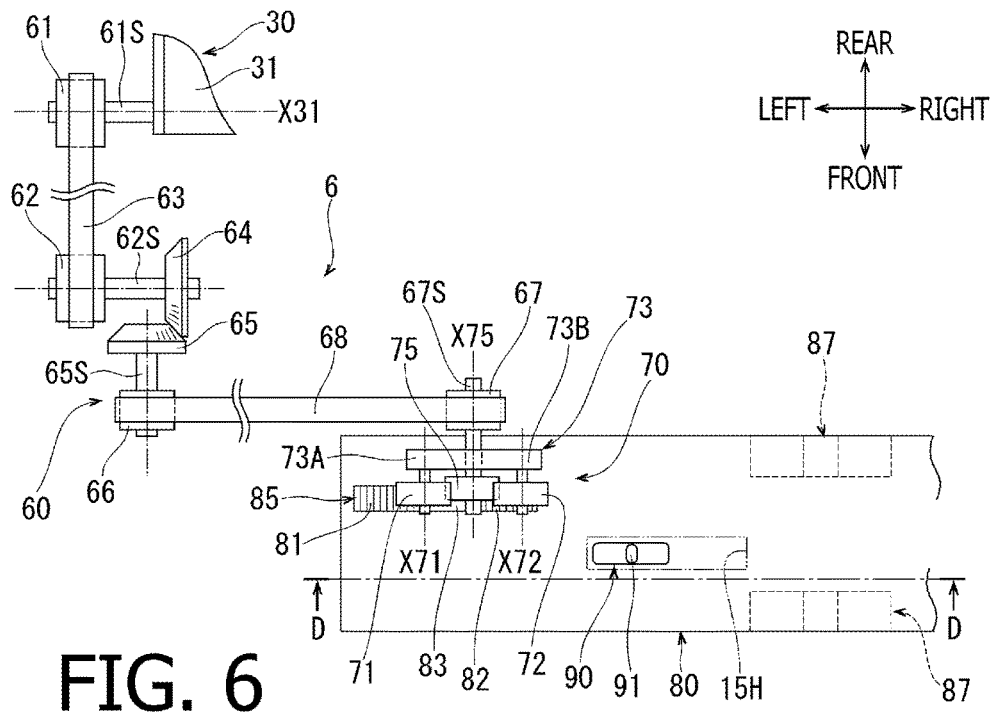
FIG. 6 is a plan view of an interior of the image reading apparatus, with the shifting device under the condition where the feeder tray is at the open position, viewed in a direction indicated by arrow Z shown in FIG. 5, according to the embodiment of the present disclosure.
Figure 8:
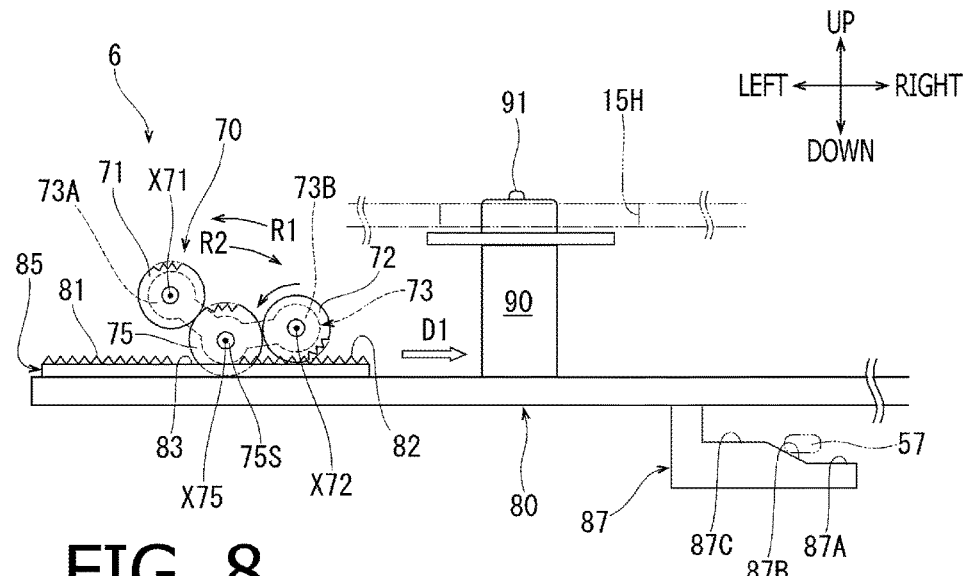

FIG. 8 is a cross-sectional view of the shifting device in the image reading apparatus, when the feeder tray moves from the open position toward the closed position, with the shifting member moving from the first shift position toward a second shift position being at an intermediate position, and the shift switch moving from the third shift position toward a fourth shift position being at an intermediate position, taken at the line D-D shown in FIG. 6, according to the embodiment of the present disclosure.

Figure 9:
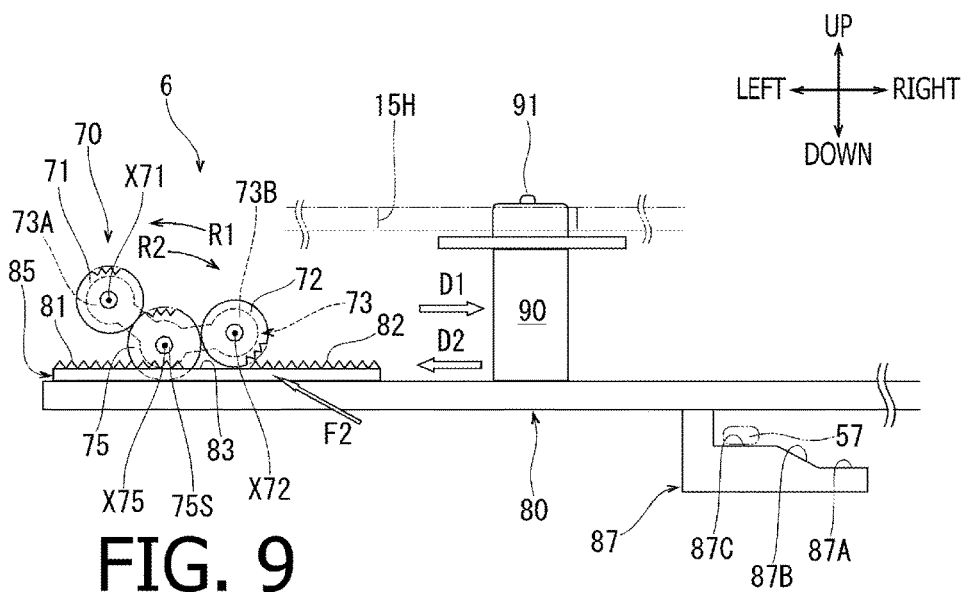

FIG. 9 is a cross-sectional view of the shifting device in the image reading apparatus, with the shifting member at the second shift position, and the shift switch at the fourth shift position, taken at the line D-D shown in FIG. 6, according to the embodiment of the present disclosure.

Figure 10:
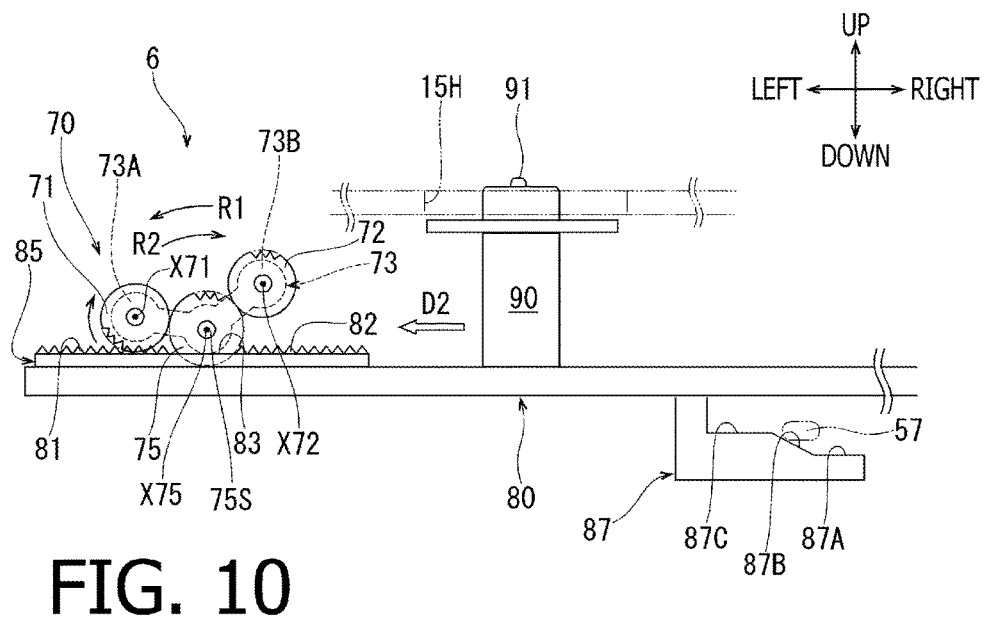

FIG. 10 is a cross-sectional view of the shifting device in the image reading apparatus, when the feeder tray moves from the closed position toward the open position, with the shifting member moving from the second shift position toward the first shift position being at an intermediate position, and the shift switch moving from the fourth shift position toward the third shift position being at an intermediate position, taken at the line D-D shown in FIG. 6, according to the embodiment of the present disclosure.

Figure 11:
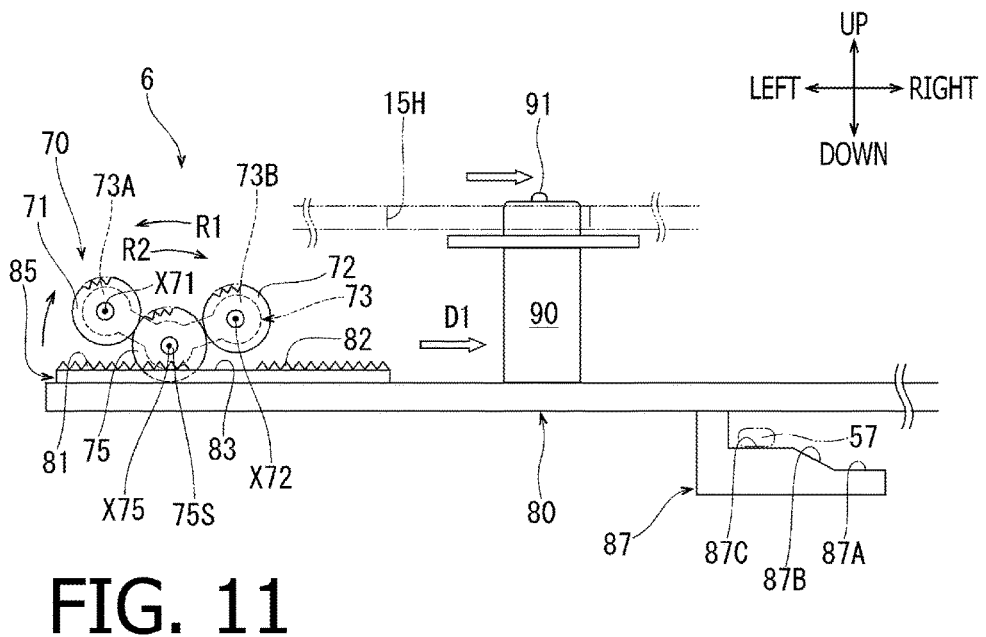

FIG. 11 is a cross-sectional view of the shifting device in the image reading apparatus, when a knob in the shift switch is moved by a user, with a first planet gear and a second planet gear being uplifted, taken at the line D-D shown in FIG. 6, according to the embodiment of the present disclosure.

Figure 12:
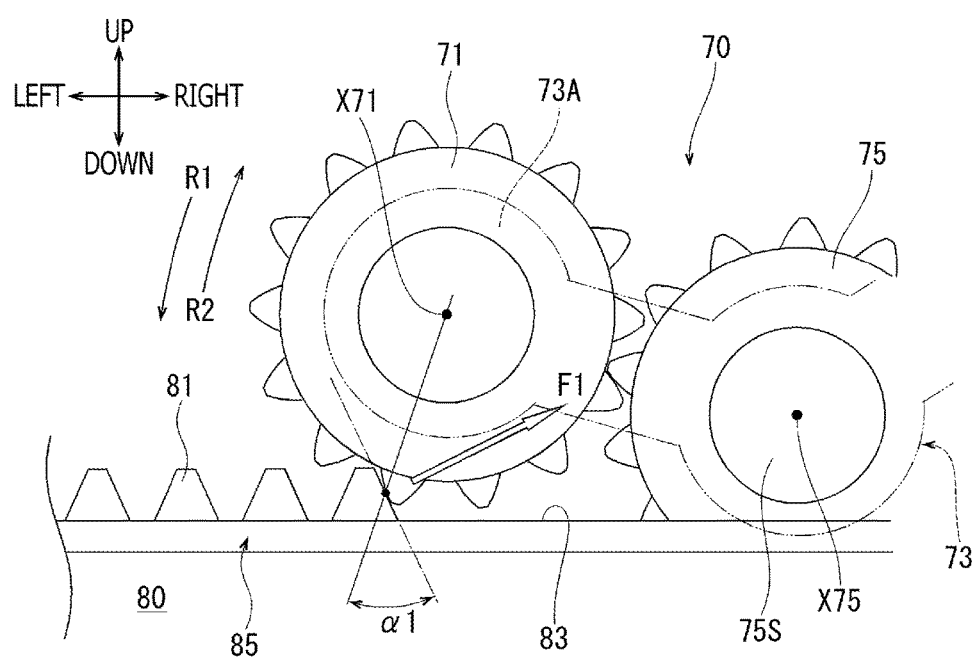

FIG. 12 is a partially enlarged illustrative view of a transmission, with a tooth in a bar portion pressing the first planet gear by a force affecting in a direction corresponding a predetermined pressure angle to rotate a coupler in a reverse rotating direction, in the image reading apparatus according to the embodiment of the present disclosure.

DETAILED DESCRIPTION

Hereinafter, an embodiment of the present disclosure will be described with reference to the accompanying drawings.

Embodiment

In the following description, directions related an image reading apparatus 1 and each part or item included in the image reading apparatus 1 will be mentioned on basis of directions indicated by arrows in each drawing. For example, in FIG. 1, a lower-left side of a body 10, on which an outlet 13 is arranged, is defined as a front side of the image reading apparatus 1. A user may face the front side of the image reading apparatus 1 to ordinarily use the image reading apparatus 1, and the user's left-hand side at the position may be defined as a leftward side of the image reading apparatus 1. A left-to-right or right-to-left direction may be called as a widthwise direction, a front-to-rear or rear-to-front direction may be called as a front-rear direction, and an up-to-down or down-to-up direction may be called as a vertical direction. Directions concerning the items shown in FIGS. 2-12 will be based on the directions in FIG. 1 and as indicated by arrows.

<Overall Configuration>

As shown in FIGS. 1-4, the image reading apparatus 1 includes the body 10. The body 10 has an approximate shape of a six-sided box, in which an upper chute member 25, a lower chute member 26, and a lower frame member 27 are assembled together and covered by an exterior shell. The body 10 includes a first inlet 11, the outlet 13, a conveyance guide 20, a second inlet 12, a switchback opening 14, and a switchback guide 24.

Figure 1:
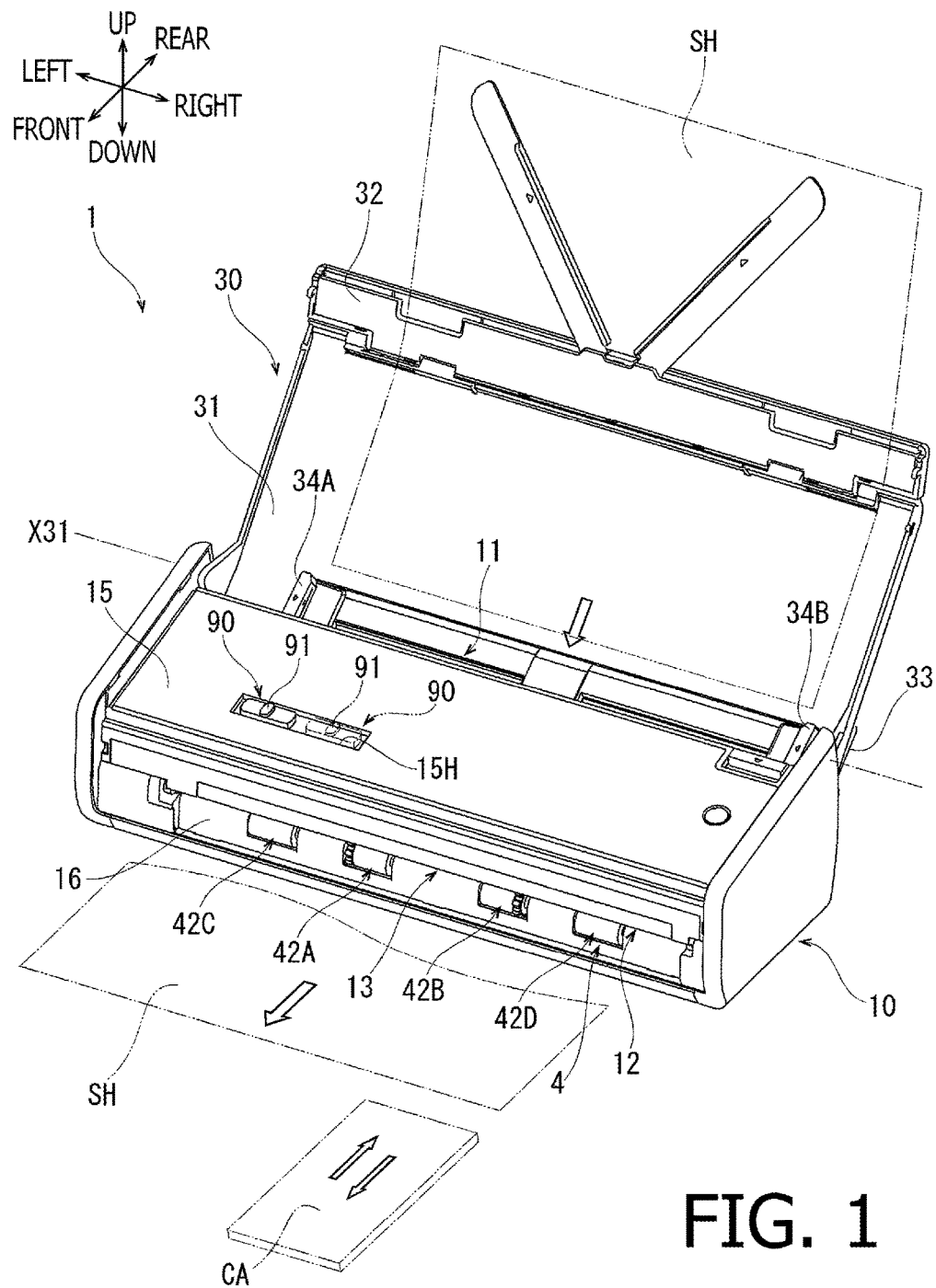
FIG. 1 is a perspective view of an image reading apparatus, with a feeder tray at an open position, according to an embodiment of the present disclosure.
Figure 3:
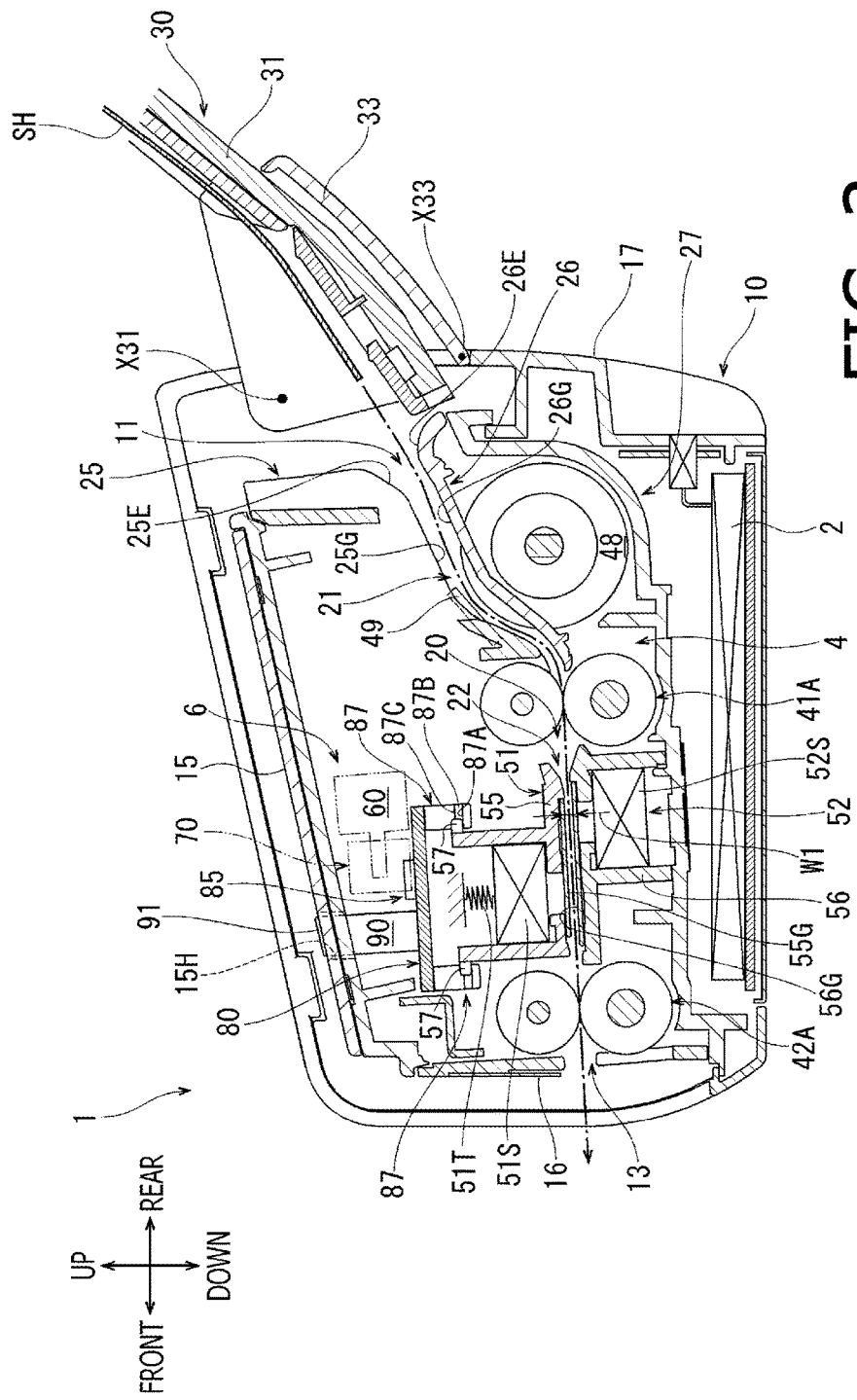
FIG. 3 is a cross-sectional view of the image reading apparatus, with the feeder tray at the open position and a first reader at a first position, taken at a line A-A shown in FIG. 2, according to the embodiment of the present disclosure.

The first inlet 11 is formed between a rear end portion of an upper wall 15 and an upper end portion of a rear wall 17 in the body 10. The first inlet 11 is an opening, of which edges are in a rectangular form elongated in the widthwise direction, formed between a rear end portion 25E of the upper chute member 25 and a rear end portion 26E of the lower chute member 26. As shown in FIGS. 1 and 3, a sheet SH may be inserted in the first inlet 11. The sheet SH may include, for example, paper and OHP film. The sheet SH may include, for example, a wider sheet, such as a letter-sized and an A4-sized printing paper, and a narrower sheet, such as a postcard. The narrower sheet such as a postcard may be used as the sheet SH that may be acceptable in the first inlet 11 when the narrower sheet is as thin and flexible as the printing paper. The first inlet 11 is formed to have a width, of which dimension is larger than a width of the sheet SH in a maximum size usable in the image reading apparatus 1.

As shown in FIGS. 1-4, the outlet 13 is formed in a vertically midst area in a front wall 16 in the body 10. The outlet 13 is an opening, of which edges are in a rectangular form elongated in the widthwise direction. As shown in FIGS. 1 and 3, the sheet SH may be discharged through the outlet 13. The outlet 13 is formed to have a width, of which dimension is larger than the width of the sheet SH in the maximum size, similarly to the first inlet 11.

Figure 4:
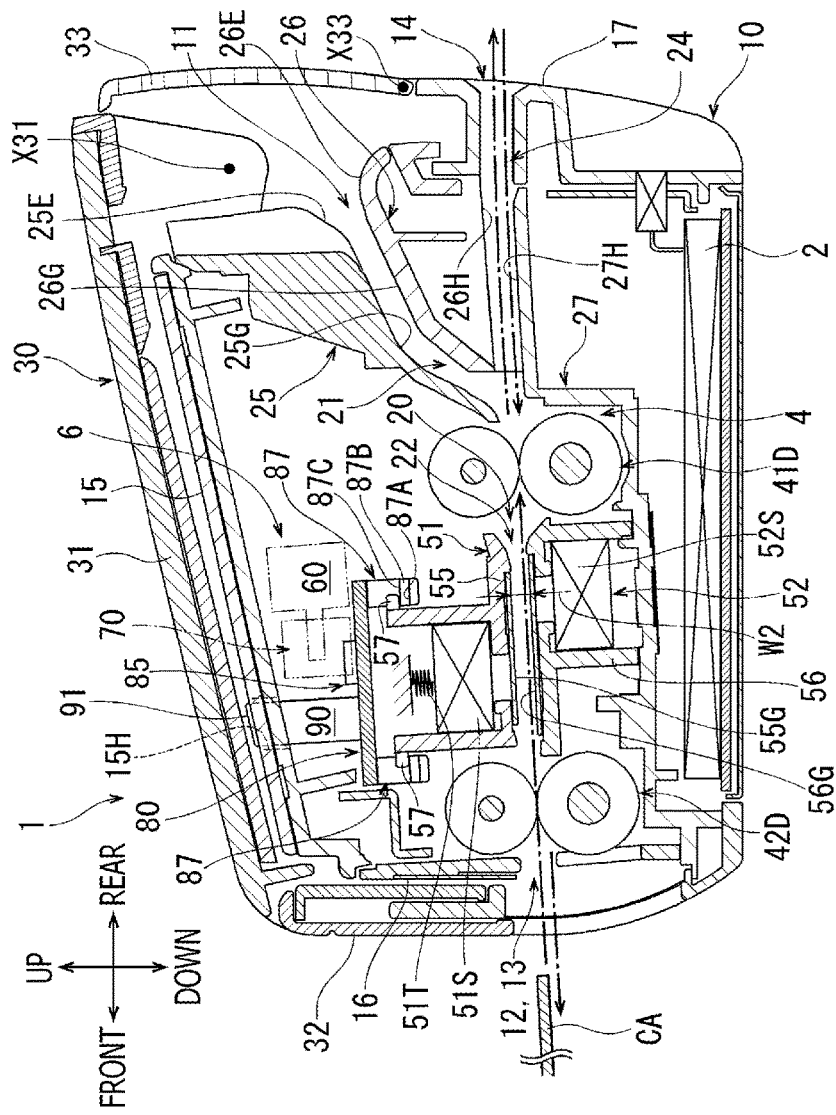
FIG. 4 is a cross-sectional view of the image reading apparatus, with the feeder tray at a closed position and the first reader at a second position, taken at a line B-B shown in FIG. 2, according to the embodiment of the present disclosure.

As shown in FIGS. 3 and 4, the lower chute member 26 is formed to have a conveyer surface 26G which inclines lower-frontward from the rear end portion 26E. The upper chute member 25 is formed to have a guide surface 25G, which inclines lower-frontward from the rear end portion 25E along the conveyer surface 26G. At a lower-frontward position with respect to the conveyer surface 26G of the lower chute member 26 in the body 10, arranged is a second reader holder 56. On an upper surface of the second reader holder 56, formed is a conveyer surface 56G, which extends substantially horizontally. At a frontward position with respect to the guide surface 25G of the upper chute member 25 in the body 10, arranged is a first reader holder 55. The first reader holder 55 is formed to have a guide surface 55G on a lower side thereof. The guide surface 55G faces the conveyer surface 56G and extends substantially horizontally.

The conveyance guide 20 has a first guide 21 and a second guide 22. The first guide 21 includes the conveyer surface 26G of the lower chute member 26 and the guide surface 25G of the upper chute member 25. In other words, the conveyer surface 26G of the lower chute member 26 and the guide surface 25G of the upper chute member 25 form the first guide 21. The first guide 21 is connected to the first inlet 11 at a rear end thereof. The sheet SH inserted in the first inlet 11 may be guided to the first guide 21, and the first guide 21 may guide the sheet SH to travel lower-frontward. The second guide 22 includes the conveyer surface 56G of the second reader holder 56 and the guide surface 55G of the first reader holder 55. In other words, the conveyer surface 56G of the second reader holder 56 and the guide surface 55G of the first reader holder 55 form the second guide 22. A rear end of the second guide 22 is connected to a front end of the first guide 21. The second guide 22 extends frontward substantially horizontally to the outlet 13. The second guide 22 may guide the sheet SH guided by the first guide 21 to the outlet 13.

Figure 2:
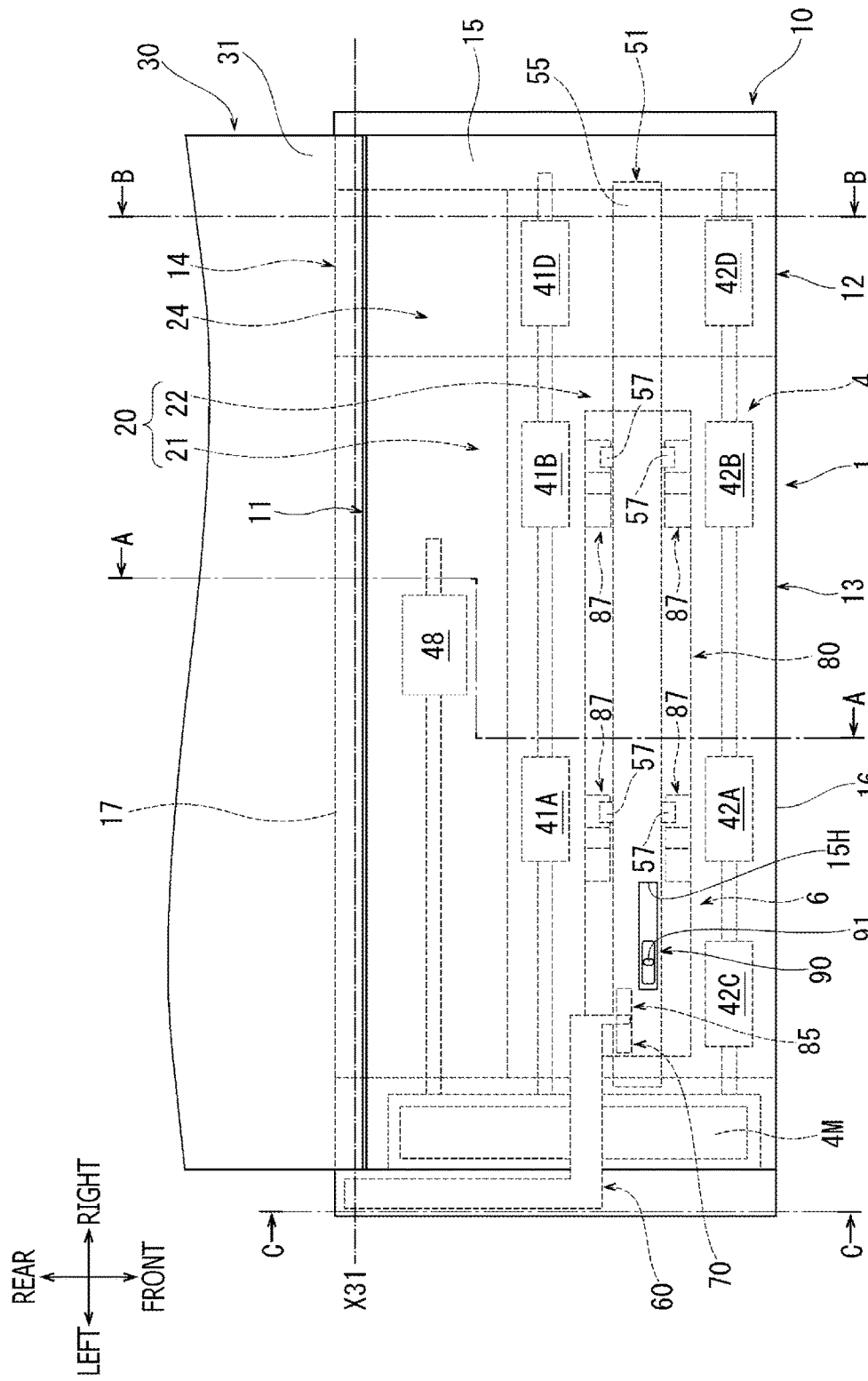
FIG. 2 is a top plan view of the image reading apparatus, with the feeder tray at the open position, according to the embodiment of the present disclosure.

As shown in FIGS. 1 and 2, a rightward part of the outlet 13 may serve as a second inlet 12. In other words, the second inlet 12 is formed in a rightward area in the front wall 16, which is in a different position from the first inlet 11. In the second inlet 12, inserted may be a card CA, which has a smaller area dimension than the sheet SH. The card CA may include, for example, a name card, a bankcard, a membership card, and a license card. The second inlet 12 is formed to have a width, of which dimension is larger than a width of the card CA. The card CA may be made of resin or may be cardboard, which is thicker and less flexible than the sheet SH.

For example, a card CA in compliance with International Standard ID-1 prescribed by International Organization for Standardization (ISO)/International Electrotechnical Commission (IEC) has lengths of 53.98 mm for the shorter side and 85.60 mm for the longer side, and a thickness of 0.76 mm.

The card CA inserted in the second inlet 12 may be guided by the rightward part of the second guide 22. The rightward part of the second guide 22 may guide the card CA once rearward and thereafter frontward.

As shown in FIGS. 2 and 4, the switchback opening 14 is formed in a rightward part of the rear wall 17 of the body 10. The switchback opening 14 is located at a position extended rearward from the second guide 22. The switchback opening 14 is formed to have a width and a thickness which are larger than the width and thickness of the card CA.

As shown in FIG. 4, the lower frame member 27 is formed to have a conveyer surface 27H, which extends from a position rearward with respect to the second guide 22 to the switchback opening 14. The lower chute member 26 is formed to have guide surface 26H on a lower side thereof. The guide surface 26H extends from a position rearward with respect to the second guide 22 to the switchback opening 14 along the conveyer surface 27H.

The switchback guide 24 includes the conveyer surface 27H of the lower frame member 27 and the guide surface 26H of the lower chute member 26. In other words, the conveyer surface 27H of the lower frame member 27 and the guide surface 26H of the lower chute member 26 form the switchback guide 24. The switchback guide 24 may guide the card CA, guided rearward by the rightward part of the second guide 22, further rearward toward the switchback opening 14. The switchback opening 14 may allow a rearward end portion of the card CA to be exposed outside the body 10. Thereafter, the switchback guide 24 may guide the card CA frontward toward the rightward part of the second guide 22. Moreover, the rearward part of the second guide 22 may guide the card CA frontward toward the rightward part of the outlet 13.

As shown in FIGS. 1-4, the image forming apparatus 1 has a feeder tray 30. The feeder tray 30 is movably supported by the body 10 to move between an open position, as shown in FIGS. 1-3, and a closed position, as shown in FIG. 4. In particular, the feeder tray 30 includes a tray body 31, a tray end portion 32, and a cover 33. The tray body 31, the tray end portion 32, and the cover 33 are each in an approximate shape of a plate.

The tray body 31 is pivotaly supported by the body 10 to pivot about a pivot axis X31. The pivot axis X31 extends in the widthwise direction at an upper-rearward position with respect to the first inlet 11.

The tray end portion 32 is coupled to a distal end portion of the tray body 31 on a side farther from the pivot axis X31.

The cover 33 is pivotably supported by the body 10 to pivot about a pivot axis X33. The pivot axis X33 extends in the widthwise direction at an upper position with respect to an upper end of the rear wall 17 of the body 10.

When the feeder tray 30 is at the open position as shown in, for example, FIG. 1, the tray body 31 and the tray end portion 32 incline upper-rearward and lower-frontward to extend continuously to the conveyer surface 26G of the lower chute member 26 and uncover the first inlet 11. The cover 33 extends to incline upper-rearward from the pivot axis 33 with an upper end thereof being in contact with a downward surface of the tray body 31.

In this posture, the feeder tray 30 may support the sheet SH to be inserted through the first inlet 11 on upward surfaces of the tray body 31 and the tray end portion 32. As shown in FIG. 1, two (2) width-restrictive guides 34A, 34B are slidably attached to the tray body 31 on the left-hand side and the right-hand side, respectively. The width-restrictive guide 34A on the left and the width-restrictive guide 34B on the right may move closer to or farther from each other to flank the sheet SH regardless of a widthwise dimension of the sheet SH. Thus, sheets SH in different sizes may be set on the feeder tray 30 with a widthwise center thereof aligning with a widthwise center of the first inlet 11.

When the feeder tray 30 is at the closed position as shown in FIG. 4, the tray body 31 extends from the pivot axis X31 to incline moderately lower-frontward to cover the upper wall 15 of the body 10 from above. The tray end portion 32 extends downward from an edge of the tray body 31 on the distal side from the pivot axis X31 to cover the front wall 16 from the front. In this posture, a lower end of the tray end portion 32 is located to be higher than the outlet 13 and the second inlet 12. The cover 33 rises upward from the pivot axis X33 with the upper end thereof being in contact with an end of the tray body 31 on a proximal side closer to the pivot axis 31. In this posture, the feeder tray 30 covers the first inlet 11 but does not cover the outlet 13 or the second inlet 12.

When the feeder tray 30 moves from the open position shown in FIG. 3 to the closed position shown in FIG. 4, and vice versa, a pivoting range for the tray body 31 to pivot may be greater than or equal to 90 degrees, or more specifically, may be in an approximate range between 120 and 160 degrees.

<Driving Control>

The image reading apparatus 1 includes a controller 2 (see FIGS. 3-4), a driving source 4M (see FIGS. 2 and 5), a conveyer 4 (see FIGS. 2-4), a first reader 51, and a second reader 52. The controller 2 is electrically connected with the driving source 4M, the conveyer 4, the first reader 51, and the second reader 52.

As shown in, for example, FIG. 3, the controller 2 is accommodated in an area the body 10 lower than the lower frame member 27. The controller 2 includes a control board (not shown), on which electrical circuits including a CPU is mounted. The controller 2 may control activation and inactivation of the driving source 4M, the first reader 51, and the second reader 52.

<Driving Source>

Figure 5:
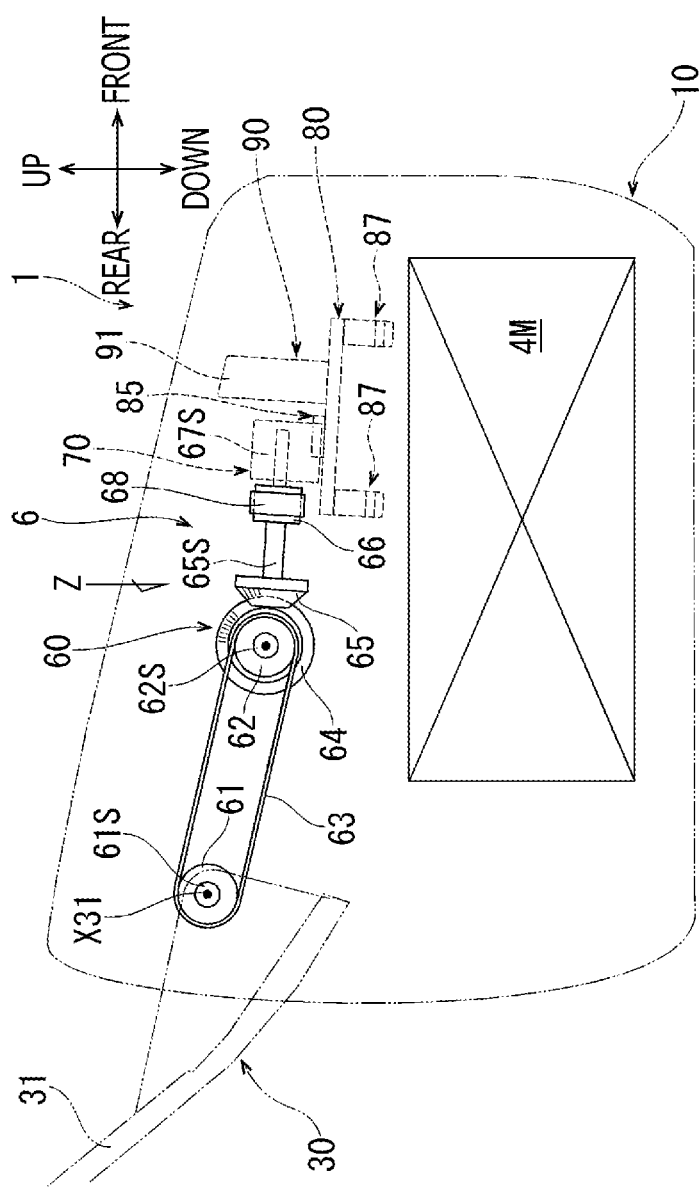
FIG. 5 is a cross-sectional view of the image reading apparatus, with a shifting device under a condition where the feeder tray is at the open position, taken at a line C-C shown in FIG. 2, according to the embodiment of the present disclosure.

As shown in FIGS. 2 and 5, the driving source 4M is accommodated in an area in the body 10 between a leftward face of the body 10 and the conveyance guide 20. The driving source 4M includes a motor and a transmission gear unit, which are not shown. The motor may be controlled and activated by the controller 2 to generate a driving force that may drive the conveyer 4.

<Conveyer>

As shown in FIGS. 2-4, the conveyer 4 includes a separator roller 48, a separator pad 49, three (3) first conveyer roller pairs 41A, 41B, 41D, and four (4) second conveyer roller pairs 42A, 42B, 42C, 42D.

The separator roller 48 as shown in FIG. 3 is rotatably supported by an inner frame, which is not shown, in the body 10. An upper part of an outer periphery of the separator roller is exposed from the conveyer surface 26G of the lower chute member 26. The separator roller 48 is located at a widthwise central position in the first guide 21.

The separator pad 49 is exposed to the first guide 21 from the guide surface 25G of the upper chute member 25 and is pressed against the separator roller 48. The separator pad 49 may be a piece of plate made of a frictional material such as rubber or elastomer.

The separator roller 48 may be driven by the driving source 4M activated by the controller 2 to rotate when the sheet SH is inserted through the first inlet 11. The separator roller 48 may contact the sheet SH, supported by the feeder tray 30 and inserted through the first inlet 11, and rotate on the sheet SH to convey the sheet SH through the first guide 21 toward the second guide 22. The separator pad 49 may work in conjunction with the separator roller 48 to separate the sheet SH from other sheets SH, if any, which may be conveyed in the first guide 21.

As shown in FIGS. 2-4, each of the first conveyer roller pairs 41A, 41B, 41D has a driving roller, which may be driven by the driving force from the driving source 4M to rotate, and a driven roller, which is arranged to face the driving roller from above. The driving rollers in the first conveyer roller pairs 41A, 41B, 41D are fixed to a same rotation shaft. The first conveyer roller pairs 41A, 41B, 41D are located at positions rearward with respect to the second guide 22. The first conveyer roller pair 41D located at a most rightward position among the first conveyer roller pairs 41A, 41B, 41D is located at a position rightward with respect to the second guide 22.

Each of the second conveyer roller pairs 42A, 42B, 42C, 42D has a driving roller, which may be driven by the driving force from the driving source 4M to rotate, and a driven roller, which is arranged to face the driving roller from above. The driving rollers in the second conveyer roller pairs 42A, 42B, 42C, 42D are fixed to a same rotation shaft. The second conveyer roller pairs 42A, 42B, 42C, 42D are located at positions frontward with respect to the second guide 22. The second conveyer roller pair 42D located at a most rightward position among the second conveyer roller pairs 42A, 42B, 42C, 42D is located at a position rightward with respect to the second guide 22.

<Conveyance of a Sheet Inserted Through the First Inlet>

When the sheet SH is inserted through the first inlet 11, the driving rollers in the first conveyer roller pairs 41A, 41B, 41D and the driving rollers in the second conveyer roller pairs 42A, 42B, 42C, 42D may be driven to rotate by the driving force from the driving source 4M, which is controlled and activated by the controller 2.

The first conveyer roller pairs 41A, 41B, 41D may nip the sheet SH conveyed by the separator roller 48 as the sheet SH reaches the second guide 22 to forward the sheet SH to the second conveyer roller pairs 42A, 42B, 42C, 42D. The second conveyer roller pairs 42A, 42B, 42C, 42D may nip the sheet SH conveyed frontward by the first conveyer roller pairs 41A, 14B, 41D and passed by the first reader 51 and the second reader 52 to discharge the sheet SH through the outlet 13.

<Conveyance of a Card Inserted Through the Second Inlet>

When the card CA is inserted through the second inlet 12, the driving rollers in the first conveyer roller pairs 41A, 41B, 41D and the driving rollers in the second conveyer roller pairs 42A, 42B, 42C, 42D may be driven to rotate by the driving force from the driving source 4M, which is controlled and activated by the controller 2. A rotating direction of the driving rollers in the first conveyer roller pairs 41A, 41B, 41D and the second conveyer roller pairs 42A, 42B, 42C, 42D is an opposite direction from a rotating direction of the driving rollers in the first conveyer roller pairs 41A, 41B, 41D and the second conveyer roller pairs 42A, 42B, 42C, 42D when the sheet SH is inserted through the first inlet 11.

The second conveyer roller pair 42D at the rightmost position may nip the card CA and convey the card CA toward the first conveyer roller pair 41D at the rightmost position. The first conveyer roller pair 41D may nip the card CA, conveyed rearward by the second conveyer roller pair 42D and passing by the first reader 51 and the second reader 52, to convey the card CA rearward so that a rearward end of the card CA may reach the switchback guide 24. The first conveyer roller pair 41D may continue nipping the card CA so that the rearward end of the card CA may be exposed outside the body 10 through the switchback opening 14.

Thereafter, the driving rollers in the first conveyer roller pairs 41A, 41B, 41D and the driving rollers in the second conveyer roller pairs 42A, 42B, 42C, 42D driven by the driving force from the driving source 4M controlled by the controller 2 may be driven to rotate in a reversed direction. Thereby, the first conveyer roller pair 41D may forward the card CA to the second conveyer roller pair 42D. The second conveyer roller pair 42D may nip the card CA conveyed frontward by the first conveyer roller pair 41D to discharge the card CA through the outlet 13.

<First Reader>

The first reader 51 includes the first reader holder 55 mentioned earlier and a reader sensor 51S held by the first reader holder 55. The second reader 52 includes the second reader holder 56 mentioned earlier and a reader sensor 52S held by the second reader holder 56. The reader sensors 51S, 52S may include, for example, a known image sensor such as CIS (contact image sensor).

The first reader 51 is located at an upper position with respect to the second guide 22. In the first reader 51, the reader sensor 51S may read an image on an upper surface of the sheet SH being guided by the second guide 22 and an image on an upper surface of the card CA being guided by the rightward part of the second guide 22.

<Second Reader>

The second reader 52 is located at a lower position with respect to the second guide 22. In the second reader 52, the reader sensor 52S may read an image on a lower surface of the sheet SH being guided by the second guide 22 and an image on a lower surface of the card CA being guided by the rightward part of the second guide 22.

<Configuration of Shifting Device>

As shown in FIGS. 3 and 4, the second reader holder 56 in the second reader 52 is supported immovably by the lower frame member 27. On the other hand, the first reader holder 55 in the first reader 51 is vertically movably supported by a frame member, which is not shown.

As shown in FIGS. 2-7, the image reading apparatus 1 has a shifting device 6 arranged inside the body 10. The shifting device 6 includes a shifting member 80, an open/close driving transmission 60, a transmission 70, and a shift switch 90. The shifting device 6 may, as will be described further below, shift the first reader 51 between a state, in which the first reader 51 is located at a first position as shown in FIG. 3, and a state, in which the first reader 51 is located at a second position higher than the first position, as shown in FIG. 4.

<First Position and Second Position>

As shown in FIG. 3, the guide surface 55G of the first reader holder 55 when the first reader 51 is at the first position and the conveyer surface 56G of the second reader holder 56 are separated from each other for a distance W1, which corresponds to a regular thickness of the sheet SH to be inserted through the first inlet 11.

As shown in FIG. 4, the guide surface 55G of the first reader holder 55 when the first reader 51 is at the second position and the conveyer surface 56G of the second reader holder 56 are separated from each other for a distance W2, which corresponds to a regular thickness of the card CA to be inserted through the second inlet 12. The distance W2 is larger than the distance W1.

<Shifting Member>

As shown in FIGS. 2 and 3, the shifting member 80 includes a plate member having an approximately rectangular shape that spreads in the widthwise and front-rear directions. The shifting member 80 extends longitudinally in the widthwise direction at an upper position with respect to the first reader 51. The shifting member 80 is movably supported by a frame member, which is not shown, to reciprocate in the widthwise direction.

<Shift Switch>

As shown in FIGS. 2-7, the shift switch 90 may be formed in a single piece integrally with the shifting member 80. The shift switch 90 protrudes upward from the shifting member 80. The shift switch 90 may have a columnar form, of which cross-section is in a rectangular shape. At an upper end portion of the shift switch 90, formed is a knob 91.

As shown in, for example, FIGS. 1-3, a knob through-hole 15H, which is in an approximately rectangular shape, is formed vertically through the upper wall 15 of the body 10, and the knob 91 is inserted through the knob through-hole 15H to protrude upward. In other words, the shift switch 90 is formed in the shifting member 80 in an arrangement such that the knob 91 may be exposed outside the body 10 through the knob through-hole 15H. The knob through-hole 15H is formed to have a substantial width, in which the knob 91 is allowed to move in the widthwise direction.

<First Shift Position and Third Shift Position>

Figure 7:
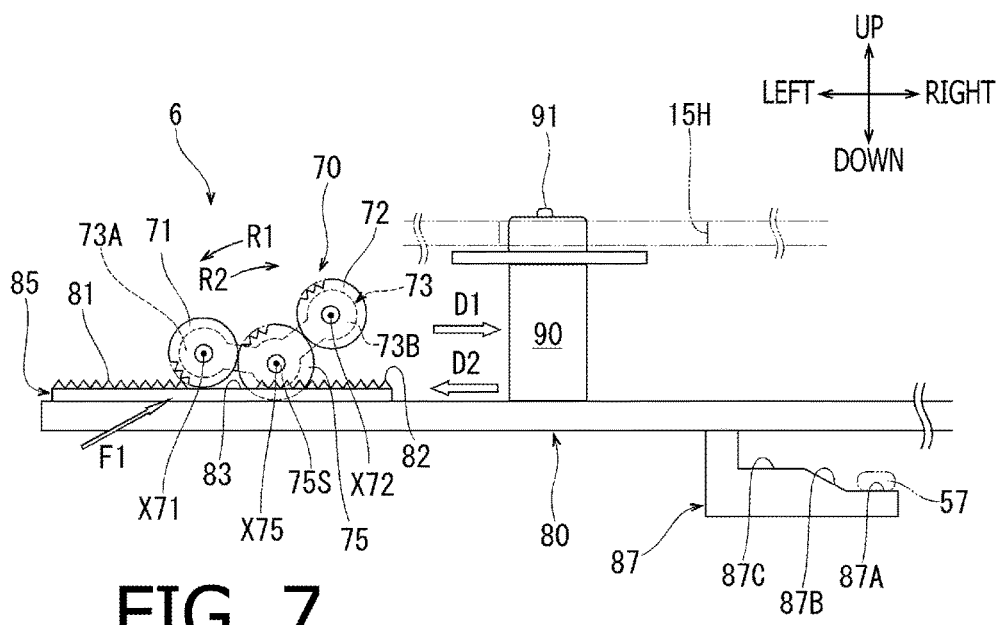
FIG. 7 is a cross-sectional view of the shifting device in the image reading apparatus, with a shifting member located at a first shift position, and a shift switch located at a third shift position, taken at a line D-D shown in FIG. 6, according to the embodiment of the present disclosure.

The shifting member 80 may be located at a first shift position as shown in FIGS. 2, 6, and 7, which is a most leftward position for the shifting member 80. When the shifting member 80 is located at the first shift position as shown in, for example, FIG. 7, the knob 91 in the shift switch 90 is, as shown in FIGS. 2, 6, and 7, located in a leftward area in the knob-through hole 51H. A position of the shift switch 90 shown in FIGS. 2, 6, 7 when the knob 91 is located in the leftward area in the knob through-hole 51H will be called as a third shift position. In FIG. 1, the knob 91 drawn in solid lines corresponds to the shift switch 90 being at the third shift position.

<Second Shift Position and Fourth Shift Position>

The shifting member 80 may be located at a second shift position as shown in FIGS. 9 and 11, which is a most rightward position for the shifting member 80. When the shifting member 80 is located at the second shift position as shown in, for example, FIG. 9, the knob 91 in the shift switch 90 is, as shown in FIGS. 9 and 11, located in a rightward area in the knob through-hole 15H. A position of the shift switch 90 shown in FIGS. 9 and 11 when the knob 91 is located in the leftward area in the knob through-hole 90 will be called as a fourth shift position. In FIG. 1, the knob 91 drawn in dash-and-dots lines corresponds to the shift switch 90 being at the fourth shift position.

FIG. 8 shows the shifting member 80 being at an intermediate position between the first shift position (see, for example, FIG. 7) and the second shift position (see, for example, FIG. 9). FIG. 8 shows the shift switch 90 being at an intermediate position between the third shift position (see, for example, FIG. 7) and the fourth shift position (see, for example, FIG. 9).

The shifting member 80 and the shift switch 90 are movable in conjunction with each other so that, when the shifting member 80 is at the first shift position (see, for example, FIG. 7), the shift switch 90 is at the third shift position (see, for example, FIG. 7); and when the shifting member 80 is at the second shift position (see, for example, FIG. 9), the shift switch 90 is at the fourth shift position (see, for example, FIG. 9).

<Knob>

The knob 91 is, when the feeder tray 30 is at the closed position as shown in FIG. 4, covered by the tray body 31. On the other hand, when the feeder tray 30 is at the open position as shown in, for example, FIG. 1, the knob 91 is uncovered. While the knob 91 is uncovered, the user may move the knob 91 in the widthwise direction, and the shift switch 90 may move between the third shift position (see, for example, FIG. 7) and the fourth shift position (see, for example, FIG. 9).

The shifting member 80 and the shift switch 90 are movable in conjunction with each other so that, when the shift switch 90 is moved to the third shift position (see, for example, FIG. 7), the shifting member 80 is moved to the first shift position (see, for example, FIG. 7); and when the shift switch 90 is moved to the fourth shift position (see, for example, FIG. 9), the shifting member 80 is moved to the second shift position (see, for example, FIG. 9).

<Configuration to Move the First Reader Between the First Position and the Second Position>

At a position in the first reader 51 between an upper surface of the reader sensor 51S and a frame member which is not shown, as shown in FIGS. 3 and 4, arranged is a compressed coiled spring 51T. The compressed coiled spring 51T urges the first reader 51 downward.

As shown in, for example, FIGS. 2 and 3, the first reader holder 55 is formed to have four (4) transmission shafts 57. Two (2) of the transmission shafts 57 protrude frontward from an upper end of a front surface of the first reader holder 55 and are spaced apart from each other in the widthwise direction. The other two (2) of the transmission shafts 57 protrude rearward from an upper end of a rear surface of the first reader holder 55 and are spaced apart from each other in the widthwise direction.

As shown in, for example, FIGS. 2, 3, and 7, the shifting member 80 includes four (4) linear-motion cams 87. The linear-motion cams 87 are arranged at positions corresponding to the transmission shafts 57 in the first reader holder 55 on one-on-one basis and are connected to a lower surface of the shifting member 80. The linear-motion cams 87 extend downward from the lower surface of the shifting member 80 and bend to extend rightward.

As shown in, for example, FIG. 7, each of the linear motion cams 87 is formed to have a first supporting surface 87A, a slope surface 87B, and a second supporting surface 87 on an upper face of the rightward extending portion. The first supporting surface 87A is a flat surface spreading substantially horizontally. The second supporting surface 87C is a flat surface spreading substantially horizontally at an upper-leftward position spaced apart from the first supporting surface 87A. The slope surface 87B is an inclined surface connecting a leftward end of the first supporting surface 87A with a rightward end of the second supporting surface 87C. A difference in height between the second supporting surface 87C and the first supporting surface 87A is equal to a difference between the distance W2 and the distance W1 (W2 minus W1).

When the shifting member 80 is at the first shift position as shown in, for example, FIG. 7, the transmission shafts 57 in the first reader holder 55 are supported by the first supporting surfaces 87A in the linear-motion cams 87 to be placed at a vertically predetermined position. FIG. 3 shows the shifting member 80 located at the first shift position (see also, for example, FIG. 7) and the transmission shafts 57 being supported on the first supporting surfaces 87A in the linear-motion cams 87. The shifting member 80 located at the first shift position (see, for example, FIG. 7) may place the first reader 51 at the first position as shown in FIG. 3.

<Shifting from First Position to Second Position>

As the shifting member 80 moves rightward, e.g., a linear-motion direction D1 shown in FIG. 7, from the first shift position (see, for example, FIG. 7), the transmission shafts 57 in the first reader holder 55 may be pushed against the slope surfaces 87B in the linear motion cams 87 and relatively climb on the slope surfaces 87B, as shown in FIG. 8. As the shifting member 80 further moves in the linear-motion direction D1 shown in FIG. 9 and shift to the second shift position as shown in, for example, FIG. 9, the transmission shafts 57 in the first reader holder 55 are supported on the second supporting surfaces 87C in the linear-motion cams 87 to be placed at a vertically predetermined position. FIG. 4 shows the shifting member 80 located at the second shift position (see also, for example, FIG. 9), and the transmission shafts 57 being supported by the second supporting surfaces 87C in the linear-motion cams 80. The shifting member 80 located at the second shift position (see, for example, FIG. 9) may place the first reader 51 at the second position as shown in FIG. 4.

<Shifting from Second Position to First Position>

As the shifting member 80 moves leftward, in a linear-motion direction D2 shown in FIG. 9, from the second shift position (see, for example, FIG. 9), the transmission shafts 57 in the first reader holder 55 may relatively slide down on the slope surfaces 87B in the linear motion cams 87, as shown in FIG. 10. As the shifting member 80 further moves in the linear-motion direction D2 shown in FIG. 7 and shift to the first shift position as shown in, for example, FIG. 7, the transmission shafts 57 in the first reader holder 55 are supported on the first supporting surfaces 87A in the linear-motion cams 87 to be placed at the vertically predetermined position and places the first reader 51 at the first position shown in FIG. 3.

<Bar Portion>

As shown in FIGS. 6 and 7, the shifting member 80 has a bar portion 85. The bar portion 85 is formed to be higher than the upper surface of the shifting member 80 at a position between a leftward edge of the shifting member 80 and the shift switch 90. The bar portion 85 is a rack gear with teeth aligning linearly in a movable direction, e.g., the widthwise direction, for the shifting member 80 to move between the first shift position and the second shift position.

The teeth in the bar portion 85 includes a first teeth 81 located on a leftward side and a second teeth 82 located on a rightward side. Each of the first teeth 81 and the second teeth 82 is a set of teeth aligning along the widthwise direction. The first teeth 81 and the second teeth 82 are spaced apart from each other in the widthwise direction. The bar portion 35 lacks teeth in a central area 83, which is between the first teeth 81 and the second teeth 82 in the movable direction.

<Open/Close Driving Transmission>

As shown in FIGS. 2 and 5, the open/close driving transmission 60 is accommodated in the body 10, in an area between the leftward face of the body 10 and the conveyance guide 20, at an upper position with respect to the driving source 4M. As shown in FIGS. 5 and 6, the open/close driving transmission 60 includes a first pulley 61, a second pulley 62, a timing belt 63, a first bevel gear 64, a second bevel gear 65, a third pulley 66, a fourth pulley 67, and a timing belt 68.

The first pulley 61 is fixed to a leftward end portion of a rotation shaft 61S, which may rotate about a rotation axis X31 integrally with the tray body 31 in the feeder tray 30. The second pulley 62 is fixed to a leftward end portion of a rotation shaft 62S, which extends in the widthwise direction at a frontward position with respect to the rotation shaft 61S. The timing belt 63 is wound around the first pulley 61 and the second pulley 62.

The first bevel gear 64 is fixed to a rightward end portion of the rotation shaft 62S. The second bevel gear 65 is fixed to a rearward end portion of a rotation shaft 65S, which extends in the front-rear direction at a frontward position with respect to the rotation shaft 62S, and engages with the first bevel gear 64.

The third pulley 66 is fixed to a frontward end portion of the rotation shaft 65S. As shown in FIG. 6, the fourth pulley 67 is fixed to a rearward end portion of the rotation shaft 67S, which extends in the front-rear direction at a rightward position with respect to the rotation shaft 65S. The timing belt 68 is wound around the third pulley 66 and the fourth pulley 72. A frontward end portion of the rotation shaft 67S protrudes in an upward area with respect to the bar portion 85 in the shifting member 80.

The rotation shafts 61S, 62S, 65S, 67S are rotatably supported by a frame member, which is not shown, in the body 10.

<Transmitting First Motion and Second Motion to the Rotation Shafts Through the Open/Close Driving Transmission>

The open/close driving transmission 60 may transmit a first motion, which may occur when the feeder tray 30 moves from the closed position shown in FIG. 4 to the open position shown in, for example, FIG. 1, in other words, by counterclockwise rotation of the rotation shaft 61S in FIG. 5, to the rotation shaft 67S. The rotation shaft 67S may be moved by the first motion to rotate in a normal rotating direction R1 as shown in FIGS. 7-11. The normal rotating direction R1 is drawn as a counterclockwise direction in FIGS. 7-11.

The open/close driving transmission 60 may transmit a second motion, which may occur when the feeder tray 30 moves from the open position shown in, for example, FIG. 1 to the closed position shown in FIG. 4, in other words, by clockwise rotation of the rotation shaft 61S in FIG. 5, to the rotation shaft 67S. The rotation shaft 67S may be moved by the second motion to rotate in a reverse rotating direction R2 as shown in FIGS. 7-11. The reverse rotating direction R2 is drawn as a clockwise direction in FIGS. 7-11.

<Transmission>

As shown in FIGS. 6 and 7, the transmission 70 is arranged in an upward position with respect to the bar portion 85 in the shifting member 80. The transmission 70 includes a sun gear 75, a first planet gear 71, a second planet gear 72, and a coupler 73.

The sun gear 75 is fixed to a frontward end portion of the rotation shaft 67S in the open/close driving transmission 60 and is rotatable about a rotation axis X75. As shown in, for example, FIG. 7, the sun gear 75 may be rotated normally by the first motion of the rotation shaft 67S rotating in the normal rotating direction R1 and may be rotated reversely by the second motion of the rotation shaft 67S rotating in the reverse rotating direction R2.

The first planet gear 71 engages with the sun gear 75 at a leftward position with respect to the rotation axis X75. The second planet gear 72 engages with the sun gear 75 at a rightward position with respect to the rotation axis X75.

The coupler 73 has an approximate shape of a plate arranged at a rearward position with respect to the sun gear 75. The rotation shaft 67S is arranged to penetrate through the coupler 73 so that the coupler 73 may rotate about the rotation axis X75 of the sun gear 75. The coupler 73 includes a first arm 73A, which extends leftward from the rotation axis X75, and a second arm 73B, which extends rightward from the rotation axis X75.

The coupler 73 supports the first planet gear 71 rotatably by the first arm 73A so that the first planet gear 71 may rotate about a first rotation axis X71 and supports the second planet gear 72 rotatably by the second arm 73B so that the second planet gear 72 may rotate about a second rotation axis X723. Thereby, the first planet gear 71A may rotate about the first axis X71 and may revolve around the rotation axis X75. Meanwhile, the second planet gear 72 may rotate about the second axis X72 and may revolve around the rotation axis X75.

<Motions in the Transmission Caused by the Feeder Tray Moving from the Open Position to the Closed Position>

When the feeder tray 30 moves from the open position as shown in, for example, FIG. 1 to the closed position as shown in FIG. 4, the open/close driving transmission 60 may transmit the second motion to the rotation shaft 67S so that the sun gear 75 may be rotated reversely by the second motion. Along with the reverse rotation of the sun gear 75, the coupler 73 may rotate in the reverse rotating direction R2. More specifically, the coupler 73 may rotate from the position shown in FIG. 7 to the position shown in FIG. 8. Thereby, the second planet gear 72 may contact the shifting member 80 and engage with the second teeth 82 in the bar portion 85. The second planet gear 72 in this position engaged with the second teeth 82 may rotate in a direction opposite to the reverse rotating direction R2. Thereby, the shifting member 80 may be moved in the linear-motion direction D1 indicated in FIGS. 8 and 9. Therefore, as shown in FIG. 9, the shifting member 80 may be placed at the second shift position. Thus, when the feeder tray 30 moves from the open position as shown in, for example, FIG. 1 to the closed position as shown in FIG. 4, the shifting device 6 may shift the first reader 51 to a state, in which the first reader 51 is located at the second position as shown in FIG. 4.

As shown in FIG. 9, when the shifting member 80 is moved to the second shift position, the second planet gear 72 may face with the central area 83 in the bar portion 85, in which no tooth is formed. This arrangement may hold the shifting member 80 steadily at the second shift position.

<Motions in the Transmission Caused by the Feeder Tray Moving from the Closed Position to the Open Position>

On the other hand, when the feeder tray 30 moves from the closed position as shown in FIG. 4 to the open position as shown in, for example, FIG. 1, the open/close driving transmission 60 may transmit the first motion to the rotation shaft 67S so that the sun gear 75 may rotate normally. Along with the normal rotation of the sun gear 75, the coupler 73 may rotate in the normal rotating direction R1 from the position shown in FIG. 9. More specifically, the coupler 73 may rotate from the position shown in FIG. 9 to the position shown in FIG. 10. Thereby, the first planet gear 71 may contact the shifting member 80 and engage with the first teeth 81 in the bar portion 85. The second planet gear 71 in this position engaged with the first teeth 81 may rotate in a direction opposite to the normal rotating direction R2. Thereby, the shifting member 80 may be moved in the linear-motion direction D2 indicated in FIGS. 10 and 7. Therefore, as shown in FIG. 7, the shifting member 80 may be placed at the first shift position. Thus, when the feeder tray 30 moves from the closed position as shown in FIG. 4 to the open position as shown in, for example, FIG. 1, the shifting device 6 may shift the first reader 51 to a state, in which the first reader 51 is located at the first position as shown in FIG. 3.

As shown in FIG. 7, when the shifting member 80 is moved to the first shift position, the first planet gear 71 may face with the central area 83 in the bar portion 85, in which no tooth is formed. This arrangement may hold the shifting member 80 steadily at the first shift position.

<Motions to Move the Shift Switch Between the Third Shift Position and the Fourth Shift Position>

When the feeder tray 30 is at the open position as shown in, for example, FIG. 1, with the knob 91 being exposed, a user may move the knob 91 in the widthwise direction to shift the position of the shift switch 90 between the third shift position as shown in, for example, FIG. 7 and the fourth shift position as shown in, for example, FIG. 9. While the knob 91 is moved in the widthwise direction by the user, the first planet gear 71 and the second planet gear 72 in the transmission 70 are separated upward from the first teeth 81 and the second teeth 82 in the bar portion 85 so that the motion of the knob 91 in the widthwise direction may not be restricted by the engagement between the first planet gear 71 and the first teeth 81 or between the second planet gear 72 and the second teeth 82.

As shown in FIG. 12, the first planet gear 71 may engage with one of the first teeth 81 in the bar portion 85 at a predetermined pressure angle $\alpha 1$. Definition of a pressure angle between gears is known and is therefore omitted herein. The predetermined pressure angle $\alpha 1$ may be, for example, 20 degrees. While the first planet gear 71 and the first teeth 81 are drawn in simplified forms in FIG. 12, the pressure angle $\alpha 1$ may appear to be larger than 20 degrees. Meanwhile, although not shown in drawings, the second planet gear 72 may engage with one of the second teeth 82 in the bar portion 85 at the predetermined pressure angle $\alpha 1$ in the same manner as the first planet gear 71.

When the user moves the knob 91 rightward, a force F1 by the tooth in the first teeth 81 in the bar portion 85 to press the first planet gear 71 may affect in a direction corresponding to the predetermined pressure angle $\alpha 1$, which is a normal direction with respect to a contact surface between the first planet gear 71 and the tooth in the first teeth 81. The force F1 may therefore affect in a circumferential direction to the rotation axis X75 of the sun gear 75 and the clockwise direction to the sun gear 75 in FIG. 12. Due to the force F1, as shown in FIG. 7, the coupler 73 may rotate from the position shown in FIG. 7 in the reverse rotating direction R2 to the position shown in FIG. 11, where the first planet gear 71 is disengaged from the first teeth 81 in the bar portion 85, and the second planet gear 72 is disengaged from the second teeth 82 in the bar portion 85.

In order to move the knob 91 from the position shown in FIG. 9 to the position shown in FIG. 7, the user may move the knob 91 leftward. When the knob 91 is moved leftward, a tooth in the second teeth 82 in the bar portion 85 may press the second planet gear 72 by a force F2 (see FIG. 9), which may affect in a direction corresponding to the predetermined pressure angle $\alpha 1$, i.e., a normal direction with respect to a contact surface between the second planet gear 72 and the tooth in the second teeth 82. The force F2 may affect in a circumferential direction to the rotation axis X75 and the counterclockwise direction to the sun gear 75 in FIG. 9. Due to the force F2, the coupler 73 may rotate from the position shown in FIG. 9 in the normal rotating direction R1 to the position, where the first planet gear 71 is disengaged from the first tooth 81 in the bar portion 85, and the second planet gear 72 is disengaged from the second teeth 82 in the bar portion 85 (see FIG. 11).

Therefore, when the feeder tray 30 is at the open position as shown in, for example, FIG. 1 with the knob 91 being exposed, the user may move the knob 91 in the widthwise direction to shift the shift switch 90 between the third shift position (see, for example, FIG. 7) and the fourth shift position (see, for example, FIG. 9) so that the first reader 51 may be shifted between the first position (see FIG. 3) and the second position (see FIG. 4) depending on the thickness of the sheet SH.

While the feeder tray 30 is at the open position as shown in, for example, FIG. 1, the user may move the knob 91 rightward to shift the shift switch 90 to the fourth shift position as shown in FIG. 11. Thereafter, with the first reader 51 being located at the second position as shown in FIG. 4, the user may move the feeder tray 30 to the closed position as shown in FIG. 4. In this situation, the shifting member 80 may be at the second shift position as shown in FIG. 11, and the second planet gear 72 may face with the central area 83 in the bar portion 85, in which no tooth is formed. In this arrangement, even when the coupler 73 rotates from the position shown in FIG. 11 in the reverse rotating direction R2 due to the second motion, and if the second planet gear 72 contacts the shifting member 80, the second planet gear 72 may merely idle so that the shifting member 80 may stay stationary. Therefore, with the first reader 51 being maintained at the second position shown in FIG. 4, the feeder tray 30 may be moved to the closed position shown in FIG. 4.

<Benefits>

The image reading apparatus 1 described above is designed to have the second inlet 12, of which size is different from the size of the first inlet 11. Specifically, while the feeder tray 30 may support the sheet SH to be inserted in the first inlet 11, the first inlet 11 may be used for the sheet SH which is thinner, and the second inlet 12 may be used for the card CA which is thicker.

When the user is to insert the sheet SH in the first inlet 11, in order for the feeder tray 30 to support the sheet SH, the feeder tray 30 is moved from the closed position shown in FIG. 4 to the open position shown in, for example, FIG. 1. The feeder tray 30 located at the open position may expose the first inlet 11. Meanwhile, as shown in FIGS. 3 and 7, the shifting device 6 may shift the first reader 51 to the state, where the first reader 51 is located at the first position. As shown in FIG. 3, the first position for the first reader 51 may be determined based on the thickness of the sheet SH to be inserted in the first inlet 11, in other words, the distance W1 between the guide surface 55G of the first reader holder 55 and the conveyer surface 56G of the second reader holder 56 may be determined in accordance of the thickness of the sheet SH, so that the first reader 51 may preferably read an image on the upper surface of the sheet SH inserted through the first inlet 11 and guided by the conveyance guide 20.

When the user is to insert the card CA in the second inlet 12, the feeder tray 30 may not be used. Therefore, the feeder tray 30 may be moved from the open position shown in, for example, FIG. 1, to the closed position shown in FIG. 4. The feeder tray 30 located at the closed position may cover the first inlet 11. Meanwhile, as shown in FIGS. 4 and 9, the shifting device 6 may shift the first reader 51 to the state, where the first reader 51 is located at the second position. The second position for the first reader 51 may be determined based on the thickness of the card CA to be inserted in the second inlet 12, in other words, the distance W2 between the guide surface 55G of the first reader holder 55 and the conveyer surface 56G of the second reader holder 56, so that the first reader 51 may preferably read an image on the upper surface of the card CA inserted through the second inlet 12 and guided by the conveyance guide 20.

According to the image reading apparatus 1 in the embodiment, the image on the upper surface of the sheet SH inserted through the first inlet 11 and the image on the upper surface of the card CA inserted through the second inlet 12 may be preferably read by the first sensor 51, of which positions may be shifted without the user's manual shifting operation as the feeder tray 30 is opened or closed.

The image reading apparatus 1 in the embodiment may improve usability to the user.

In the image reading apparatus 1 according to the embodiment, the shifting device 6 includes the open/close driving transmission 60, the shifting member 80, and the transmission 70, which enable the positions of the first reader 51 to be shifted effectively according to the opening or closing motion of the feeder tray 30. Moreover, the shifting device 6 may shift the positions of the first reader 51 mechanically without using electrical devices such as a sensor or an actuator; therefore, manufacturing cost of the image reading apparatus 1 may be lowered.

In the image reading apparatus 1 according to the embodiment, with the transmission 70 including the mechanical parts of the sun gear 75, the first planet gear 71, the second planet gear 72, and the coupler 73, as shown in, for example, FIG. 7, the positions of the shifting member 80 may be correctly shifted.

In the image reading apparatus 1 according to the embodiment, with the engagement in the shifting member 80 between the first teeth 81 in the bar portion 85 and the first planet gear 71, or the engagement between the second teeth 82 in the bar portion 85 and the second planet gear 72, the positions of the shifting member 80 may be securely shifted.

In the image reading apparatus 1 according to the embodiment, the bar portion 85 has the central area 83, in which no tooth is formed, between the first teeth 81 and the second teeth 82 in the movable direction. With this arrangement, the shifting member 80 may shift from the first shift position shown in FIG. 7 through the intermediate position shown in FIG. 8 to the second shift position shown in FIG. 9, and from the second shift position shown in FIG. 9 through the intermediate position shown in FIG. 8 to the first shift position shown in FIG. 7.

When the feeder tray 30 moves from the open position shown in, for example, FIG. 1 to the closed position shown in FIG. 4, the open/close driving transmission 60 may transmit the second motion to the rotation shaft 67S, and the sun gear 75 may be rotated reversely. Accordingly, the coupler 73 may rotate in the reverse rotating direction R2 along with the reverse rotation of the sun gear 75. Specifically, the coupler 73 may rotate from the position shown in FIG. 7 to the position shown in FIG. 8. The second planet gear 72 may contact the shifting member 80 and engage with the second teeth 82 in the bar portion 85. With the second planet gear 72 engaged with the second teeth 82, the second planet gear 72 rotating at the position in the direction opposite to the reverse rotating direction R2 may move the shifting member 80 in the linear-motion direction D1 shown in FIGS. 8 and 9. As a result, the shifting member 80 may be shifted to the second shift position as shown in FIG. 9. Thus, when the feeder tray 30 moves from the open position shown in, for example, FIG. 1 to the closed position shown in FIG. 4, the shifting device 6 may shift the first reader 51 to the state where the first reader 51 is maintained at the second position shown in FIG. 4. As shown in FIG. 9, when the shifting member 80 is at the second shift position, the second planet gear 72 faces with the central area 83, in which no tooth is formed, in the bar portion 85, and the shifting member 80 may be maintained steadily at the second shift position.

On the other hand, when the feeder tray 30 moves from the closed position shown in FIG. 4 to the open position shown in, for example, FIG. 1, the open/close driving transmission 60 may transmit the first motion to the rotation shaft 67S, and the sun gear 75 may be rotated normally by the first motion. Accordingly, the coupler 73 may rotate in the normal rotating direction R1 along with the normal rotation of the sun gear 75. Specifically, the coupler 73 may rotate from the position shown in FIG. 9 to the position shown in FIG. 10. The first planet gear 71 may contact the shifting member 80 and engage with the first teeth 81 in the bar portion 85. With the first planet gear 71 engaged with the first teeth 81, the first planet gear 71 rotating at the position in the direction opposite to the normal rotating direction R1 may move the shifting member 80 in the linear-motion direction D2 shown in FIGS. 10 and 7. As a result, the shifting member 80 may be shifted to the first shift position as shown in FIG. 7. Thus, when the feeder tray 30 moves from the closed position shown in FIG. 4 to the open position shown in, for example, FIG. 1, the shifting device 6 may shift the first reader 51 to the state where the first reader 51 is maintained at the first position shown in FIG. 3. As shown in FIG. 7, when the shifting member 80 is at the first shift position, the first planet gear 71 faces with the central area 83, in which no tooth is formed, in the bar portion 85, and the shifting member 80 may be maintained steadily at the second shift position.

When the feeder tray 30 is at the open position shown in, for example, FIG. 1, and after the user moves the knob 91 rightward to shift the shift switch 90 to the fourth shift position shown in FIG. 11, the user may move the feeder tray 30 to the closed position shown in FIG. 4 while the first reader 51 is maintained at the second position shown in FIG. 4. In this situation, as shown in FIG. 11, the shifting member 80 is at the second shift position, where the second planet gear 72 faces the central area 83 containing no tooth in the bar portion 85. Therefore, when the coupler 73 is moved by the second motion from the position shown in FIG. 11 to rotate in the reverse rotating direction R2, and even if the second planet gear 72 contacts the shifting member 80, the second planet gear 72 may merely idle, and the shifting member 80 may stay steady. Therefore, with the first reader 51 maintained at the second position shown in FIG. 4, the feeder tray 30 may move to the closed position shown in FIG. 4.

In the image reading apparatus 1, thicknesses of the sheets SH to be inserted in the first inlet 11 may vary. According to the embodiment, the user may move the knob 91 in the shift switch 90 to shift the positions of the first reader 51 according to the thickness of the sheet SH to be inserted through the first inlet 11. In this situation, the motions in the shifting member 80 caused by the opening/closing motions of the feeder tray 30 and the motions in the shifting member 80 caused by the shift switch 90 may be enabled through the transmission 70 described above.

In the image reading apparatus 1 according to the embodiment described above, when the shift switch 90 is shifted by the rightward movement of the knob 91 from the third shift position to the fourth shift position, the force F1 from one of the first teeth 81 in the bar portion 85 to press the first planet gear 71 may affect in the direction corresponding to the predetermined pressure angle α1, as shown in FIGS. 7 and 12, and the coupler 73 may be moved by the force F1 to rotate in the reverse rotating direction R2. On the other hand, when the shift switch 90 is shifted by the leftward movement of the knob 91 from the fourth shift position to the third shift position, the force F1 from one of the second teeth 82 in the bar portion 85 to press the second planet gear 72 may affect in the direction corresponding to the predetermined pressure angle α1, as shown in FIG. 9, and the coupler 73 may be moved by the force F1 to rotate in the normal rotating direction R1. According to these motions, the first planet gear 71 is disengaged from the first teeth 81 in the bar portion 85, and the second planet gear 72 is disengaged from the second teeth 82 in the bar portion 85, as shown in FIG. 11. Therefore, when the shift switch 90 is shifted between the third shift position and the fourth shift position, the first planet gear 71 and the second planet gear 72 may not be interfered with by the first teeth 81 or the second teeth 82 and may be restrained from interfering with the shifting member 80.

In the image reading apparatus 1 according to the embodiment described above, the transmission 70 is located at the upper position with respect to the shifting member 80 as shown in FIGS. 3 and 7; therefore, the space to accommodate the transmission 70 may be securely reserved.

In the image reading apparatus 1 according to the embodiment described above, the feeder tray 30 may cover the knob 91 when the feeder tray 30 is at the closed position shown in FIG. 4 and expose the knob 91 when the feeder tray 30 is at the open position shown in, for example, FIG. 1. Therefore, the user may move the knob 91 in the shift switch 90 merely when the feeder tray 30 is in the open position shown in, for example, FIG. 1. If the thicknesses of the cards CA tend to stay in a smaller range, and the positions of the first reader 51 may not necessarily be shifted each time depending on thicknesses of the cards CA, the user's manual operation to shift the positions of the first reader 51 may be omitted.

The image reading apparatus 1 according to the embodiment described above is equipped with the first reader 51 and the second reader 52 in the body 10; therefore, the images on the upper side and the lower side of the sheet SH or the card CA conveyed by the conveyer 4 may be read efficiently.

In the image reading apparatus 1 according to the embodiment described above, the first reader 51 is located at the position higher than the conveyance guide 20. Meanwhile, the second position shown in FIG. 4 is located at the position higher than the first position shown in FIG. 3. With this arrangement, the shifting device 6 may move the first reader 51, which is located above the sheet SH or the card CA conveyed by the conveyer 4, upward from the first position to the second position. Therefore, the sheet SH or the card CA may be restrained from being interfered with by the first reader 51 moving to the second position.

Although an example of carrying out the invention have been described, those skilled in the art will appreciate that there are numerous variations and permutations of the image reading apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the shifting device may have a sensor that may detect the opening/closing motions of the feeder tray and an actuator that may cause the first reader to move between the first position and the second position.

For another example, the motions of shifting member may not necessarily be limited to the linear motions, but the shifting member may be rotatable. For another example, the shift switch may not necessarily be formed integrally with the shifting member but may be formed separately from the shifting member and connected to the shifting member through, for example, gears and links.

For another example, the knob in the shift switch may be exposed through, for example, an opening formed in the feeder tray so that the knob may be moved when the feeder tray is at the closed opposition as well as the knob is movable when the feeder tray is at the open position. If the knob is movable while the feeder tray is at the closed position, when the media with different thicknesses are inserted through the second inlet, the positions of the first reader may be shifted preferably.

For another example, the second inlet may be arranged at the position of the switchback opening 14 so that the card CA may be inserted through the rear wall 17 of the body 10 and ejected through the rightward area of the outlet 13.

What is claimed is:

1. An image reading apparatus, comprising:
    a body comprising:
        a first inlet;
        a second inlet arranged at a position different from the first inlet; and
        a conveyance guide configured to guide a readable medium inserted in the body through one of the first inlet and the second inlet;
    a feeder tray movably supported by the body to move between an open position and a closed position, the feeder tray being configured to cover the first inlet at the closed position, the feeder tray being configured to expose the first inlet and support the readable medium to be inserted through the first inlet thereon at the open position;
    a conveyer arranged in the body, the conveyer being configured to convey the readable medium guided by the conveyer guide;
    a first reader arranged in the body, the first reader being configured to read an image on a first side of the readable medium conveyed by the conveyer; and
    a shifting device arranged in the body, the shifting device being configured to shift the first reader to a first position in a case where the feeder tray moves from the closed position to the open position, the shifting device being configured to shift the first reader to a second position in a case where the feeder tray moves from the open position to the closed position.

2. The image reading apparatus according to claim 1, wherein the shifting device comprises:
    an open/close driving transmission configured to transmit a first motion caused by the feeder tray moving from the closed position to the open position, the open/close driving transmission being configured to transmit a second motion caused by the feeder tray moving from the open position to the closed position;
    a shifting member configured to move between a first shift position and a second shift position, the shifting member being configured to move the first reader to the first position in a case where the shifting member is at the first shift position, the shifting member being configured to move the first reader to the second position in a case where the shifting member is at the second shift position; and
    a transmission, to which the first motion and the second motion are transmittable from the open/close driving transmission, the transmission being configured to transmit the first motion to the shifting member to move the shifting member to the first shift position, the transmission being configured to transmit the second motion to the shifting member to move the shifting member to the second shift position.

3. The image reading apparatus according to claim 2, wherein the transmission comprises:
    a sun gear configured to rotate normally by the first motion, the sun gear being configured to rotate reversely by the second motion;
    a first planet gear engageable with the sun gear;
    a second planet gear engageable with the sun gear; and
    a coupler configured to rotate about a rotation axis of the sun gear, the coupler being configured to support the first planet gear rotatably to rotate about a first axis and the second planet gear rotatably to rotate about a second axis,
    wherein the coupler rotating in a normal rotating direction along with normal rotation of the sun gear causes the first planet gear to contact the shifting member and move the shifting member to the first shift position; and
    wherein the coupler rotating in a reverse rotating direction along with reverse rotation of the sun gear causes the second planet gear to contact the shifting member and move the shifting member to the second shift position.

4. The image reading apparatus according to claim 3,
    wherein the shifting member comprises a bar portion, the bar portion comprising teeth aligning linearly along a movable direction for the shifting member to move between the first shift position and the second shift position,
    wherein the teeth in the bar portion engage with the first planet gear in a case where the first planet gear contacts the shifting member, and
    wherein the teeth in the bar portion engage with the second planet gear in a case where the second planet gear contacts the shifting member.

5. The image reading apparatus according to claim 4, wherein the bar portion lacks the teeth at a central area thereof in the movable direction.

6. The image reading apparatus according to claim 5,
    wherein the shifting member comprises a shift switch with a knob, the shift switch being arranged to expose the knob outside the body, the shift switch being movable between a third shift position and a fourth shift position by movement of the knob, and
    wherein the shifting member and the shift switch are movable in conjunction with each other so that the shift switch is located at the third shift position in the case where the shifting member is at the first shift position, and the shift switch is located at the fourth shift position in the case where the shifting member is at the second shift position.

7. The image reading apparatus according to claim 6,
    wherein the first planet gear is engageable with one of the teeth in the bar portion at a predetermined pressure angle, and
    wherein, in a case where the shift switch is moved from the third shift position to the fourth shift position by the movement of the knob, a force by the one of the teeth in the bar portion to press the first planet gear affecting in a direction corresponding to the predetermined pressure angle causes the coupler to rotate in the reverse rotating direction and causes the first planet gear and the second planet gear to be disengaged from the teeth in the bar portion.

8. The image reading apparatus according to claim 6,
    wherein the second planet gear is engageable with one of the teeth in the bar portion at a predetermined pressure angle, and
    wherein, in a case where the shift switch is moved from the fourth shift position to the third shift position by the movement of the knob, a force by the one of the teeth in the bar portion to press the second planet gear affecting in a direction corresponding to the predetermined pressure angle causes the coupler to rotate in the normal rotating direction and causes the first planet gear and the second planet gear to be disengaged from the teeth in the bar portion.

9. The image reading apparatus according to claim 8, wherein the transmission is arranged at an upper position with respect to the shifting member.

10. The image reading apparatus according to claim 9, wherein the feeder tray is configured to cover the knob in a case where the feeder tray is at the closed position, and the feeder tray being configured to expose the knob in a case where the feeder tray is at the open position.

11. The image reading apparatus according to claim 1, further comprising:
   a second reader arranged in the body, the second reader being configured to read an image on a second side of the readable medium conveyed by the conveyer.

12. The image reading apparatus according to claim 1, wherein the readable medium to be supported by the feeder tray to be inserted through the first inlet is a sheet; and
   wherein the readable medium to be inserted through the second inlet is a card thicker than the sheet.

13. The image reading apparatus according to claim 1, wherein the first reader is located at an upper position with respect to the conveyance guide, and
   wherein the second position is an upper position with respect to the first position.

* * * * *